United States Patent [19]
Richmond

[11] Patent Number: 5,813,307
[45] Date of Patent: Sep. 29, 1998

[54] BAND SAW WOODWORKING MACHINE

[76] Inventor: Paul A. Richmond, c/o Richmond Woodworks Inc. Box 1577 State Rte. 39 NE., New Philadelphia, Ohio 44663

[21] Appl. No.: 696,154

[22] Filed: Aug. 13, 1996

[51] Int. Cl.$^6$ ...................................................... B26D 1/54
[52] U.S. Cl. .................................. 83/820; 83/788; 83/809
[58] Field of Search ............................. 83/810, 809, 792, 83/813, 816, 817, 820, 55, 788

[56] References Cited

U.S. PATENT DOCUMENTS

| 562,042 | 6/1896 | Shaw ..................................... 83/816 X |
|---|---|---|
| 2,625,965 | 1/1953 | Crane ..................................... 83/820 X |
| 3,059,516 | 10/1962 | Cleland et al. ........................ 83/820 X |
| 3,092,155 | 6/1963 | Fowler, Jr. et al. ....................... 83/813 |
| 3,142,321 | 7/1964 | Orescan ..................................... 83/810 |
| 3,668,961 | 6/1972 | Blue ..................................... 83/820 X |
| 3,815,465 | 6/1974 | Smierciak ................................. 83/820 |
| 3,913,436 | 10/1975 | Orescan ............................... 83/810 X |
| 4,193,192 | 3/1980 | Cortez .................................. 83/817 X |
| 4,693,155 | 9/1987 | Ledford, Jr. .......................... 83/809 X |

*Primary Examiner*—Maurina T. Rachuba

[57] ABSTRACT

A band saw woodworking machine having a band saw which moves in an undulating path created by a plurality of adjustable idler rollers to cut a work piece having curved parts.

8 Claims, 4 Drawing Sheets

BAND SAW WOODWORKING MACHINE

BACKGROUND OF THE INVENTION

Field of the Invention

The present invention relates to a band saw woodworking machine to cut out shaped pieces of wood for legs and other parts of tables. The wood part to be cut is characterized by having undulations in the form of indentations and protrusions so that the band saw must bend to form these curve parts.

In large scale production of legs for tables, there is a need to cut out the legs from hardwood, such as oak, in order to form the legs in large quantities while still providing great safety so that injuries to the workman may be minimal if non-existent.

SUMMARY OF THE INVENTION

In the production of large quantities of legs for end and side tables there is a need to cut the legs so that they have the necessary curves, that is, indentations and protrusions to meet a desired design shape. At the same time, production must be done in a way that all OSHA requirements are met and the workers' safety is maximized. The primary purpose of this machine is to make the first cut of the legs which may be from oak boards 1" or 2" thick. The oak boards are sometimes glued to form 4 inches or more of stock which must be cut with various curved indentations and sometimes protrusions. This should be done with as few machine operations on the band saw as possible.

The woodworking machine of the present invention has a woodworking table which acts as a conveyor and is designed to take an oak work piece 1" or 2" thick and 8" to 12" in length and width to clamp it to the woodworking table in front of an operator. The operator then takes his hands off of the work piece and actuates switches that are in a sequence and can not be taped or fastened in a closed position. Therefore, both hands must be off of the work table for this process. The table moves away from the worker some distance while under the band saw.

A hydraulic cylinder provides the means for moving the work piece, i.e., the oak under the band saw, to shape it into a curved piece with undulating protrusions and indentations. The band saw has a cutting edge in contact with the work piece and 3" or 4" away from an edge supported by a series of idler rollers mounted on arms and supporting the band saw in an undulating path, so that the opposite cutting edge forms a saw kerf in an undulating, but pre-programmed path.

Upon completion, the work table is reversed and the work piece is removed from contact with the band saw and moved back to its original position. During this time, the band saw is at an arms length from the operator, so that there is no chance for the operator to become injured.

In another embodiment of the invention, the table is angled 5°–20° so that as the band saw contacts the work piece, the load will increase gradually and reduce heavy loads on the drive motor as the band saw engages the work piece.

When the work piece returns to the starting position, the operator unclasps the work piece, installs another work piece, and the operation is repeated.

DETAILED DESCRIPTION OF THE PREFERRED EMBODIMENTS

Figure 1:
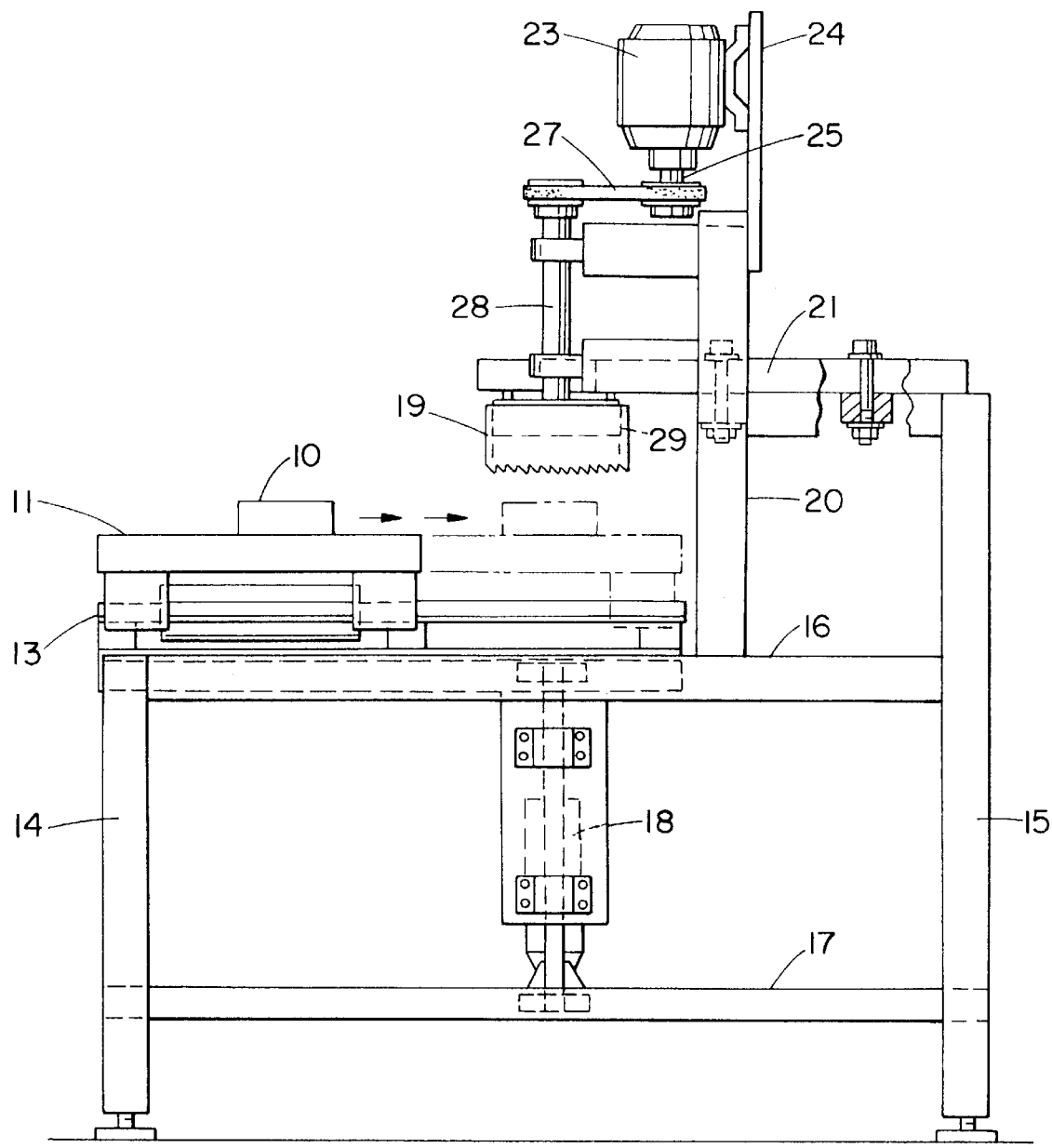
FIG. 1 is a right hand view of a band saw woodworking machine according to the present invention.

FIG. 1 is a side view of the woodworking machine of the present invention. An operator is positioned to the left of the machine and clamps a work piece 10 onto the machine table 11 which acts as a conveyer and which is driven to the right, as shown, on tracks 13. Floor supports or legs for the machine are shown at 14 on the left and 15 on the right and constitute part of a frame. Lateral braces 16 and 17 extend between the legs 14 and 15. A hydraulic cylinder 18 elevates a platform 12 on which table 11 is mounted to position the work piece at a suitable height for band saw 19 to cut the work piece 10 into a specific shape.

For the operating parts of the band saw mechanism, a vertical support is shown at 20, which is fastened to a horizontal support member 21. A band saw drive motor is shown at 23 which is the power means for driving the band saw. The motor 23 fastened to bracket 24. The band saw mechanism further includes a drive shaft 25, pulley 26, cog driving belt 27 and a vertical shaft 28 connected to band saw driving hub 29.

Figure 2:
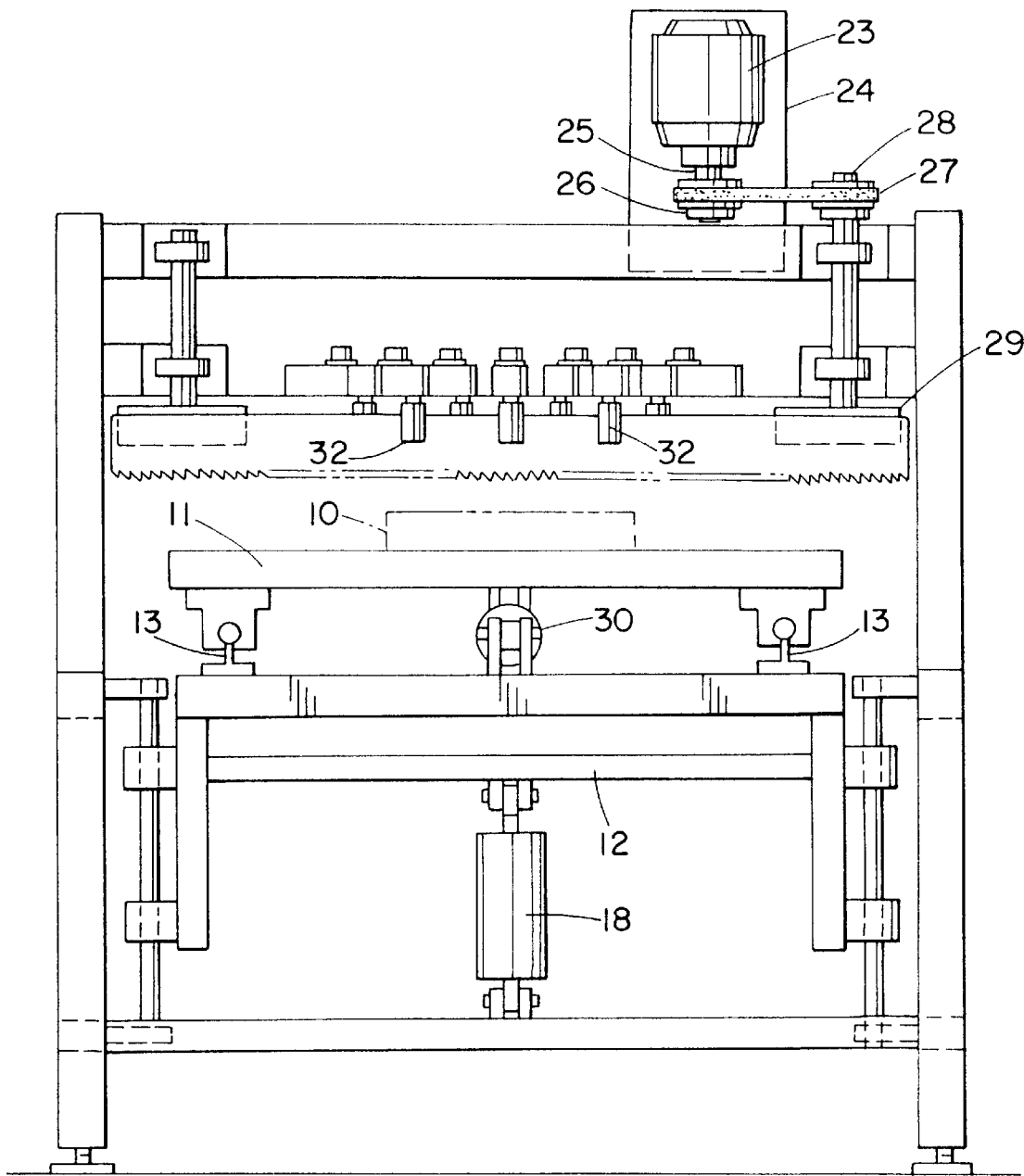
FIG. 2 is a front view of the machine showing the band saw and the idlers that control the path of the band saw.
Figures 3, 3A:
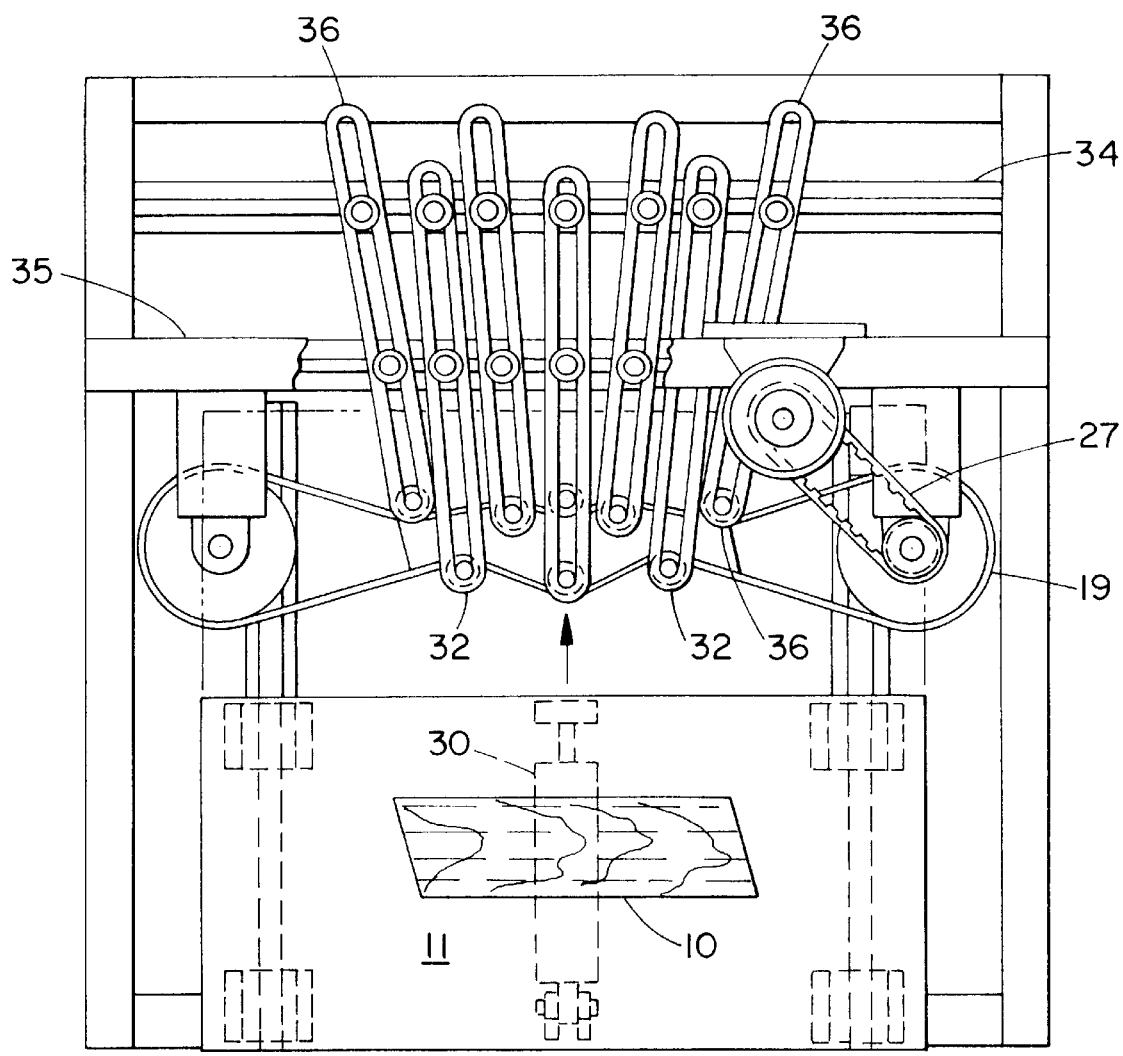
FIG. 3 is a top view of the machine showing the band saw and the idlers that control the path of the band saw to cut a shaped piece from the work piece.
FIG. 3A is an enlarged view of the cog belt drive for the band saw.

FIG. 2 is a front view which shows the machine from an operator's position. Table 11 has a hydraulic cylinder 30 connected thereto as a means for moving the table 11 on which the work piece is mounted away from the operator to a position under the band saw 19. FIG. 2 also shows idler rollers 32 which are positioned to guide the band saw 19 along a predetermined undulating path. There are at least 8 idlers. These idlers are on both the inside and outside of the band saw 19 to hold the band saw 19 in a desired fixed position on any job. The band saw 19 cuts the work piece to produce indentations and protrusions before sanding, surface staining and painting are done. FIG. 3 shows a series of steel loops 36 forming a network of supporting arms and having a support 34 in the rear and a support 35 in the middle so that the front end of each loop 36 holds an idler in a fixed position. This enables the band saw 19 to move in a serpentine path through the work piece to form the exact shape needed for the final shape of the legs for the table.

The band saw 19 is driven by motor 23 through drive shaft 25, pulley 26, cog driving belt 27, vertical shaft 28 and hub 29. Even with all the band saw bends caused by the idlers which control the path of the band saw, there is a surprising life expectancy in the band saw 19.

The table 11 and work piece 10 are shown in FIG. 3 in a position about to move under the band saw. After the work piece has been moved into position and cut, the table retracts and returns to its original position. The work piece is then released from clamps and a new work piece can be fastened to the table 11.

Figure 4:
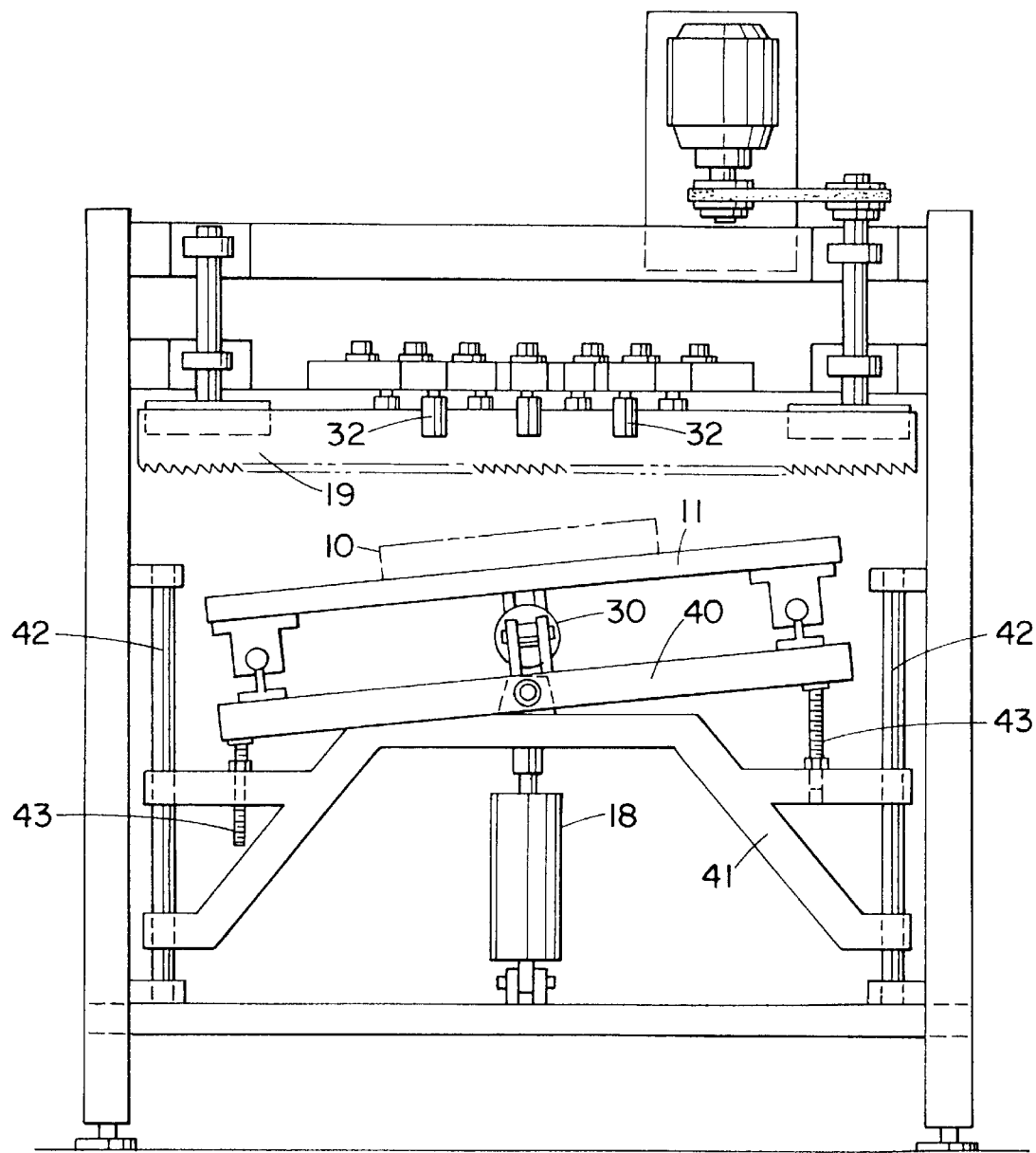
FIG. 4 is a front view showing another embodiment of the invention wherein the work table may set an angle in the range of 5°–20° to facilitate the cutting load on the band saw.

FIG. 4 shows a variant form of a platform 40 for the supporting table and the work piece. Here, the platform 40 is fastened so as to be adjustable to an angle in the range of 5°–20° to either side. The means for angling the work piece includes a support structure 41 slidably mounted on guides 42 attached to the machine frame. Adjustable screws 43 are attached to the support structure 41 for varying the angle of the platform 40 and, consequently the angle of the table 11 and the work piece held thereon. Cylinder 18 moves the supporting structure up and down. When the band saw 19 initially cuts one end of the work piece and then gradually cuts the full work piece as the saw kerf deepens.

I claim:

1. A band saw woodworking machine comprising:
   a table for holding a work piece thereon;
   a band saw spaced from said table and having a cutting edge on one side and a band portion on an opposite side;
   power means for driving said band saw in a path;
   a plurality of idlers positioned to engage both sides of said band saw at the band portion thereof; and
   means for adjusting the position of each of said idlers to engage said band saw whereby a portion of said band saw is formed into an undulated shape which cuts curved surfaces in the work piece when said band saw and the work piece come into contact.

2. A band saw woodworking machine according to claim 1 which further includes means for adjusting said table laterally and vertically to position the work piece for contact with said band saw.

3. A band saw woodworking machine according to claim 2 which further includes means for tilting said table at an angle to a horizontal plane.

4. A band saw woodworking machine according to claim 3 wherein said means for tilting said table comprises adjustable screw means.

5. A band saw woodworking machine according to claim 1 wherein said means for adjusting the position of said idlers comprises an adjustable arm for each idler.

6. A band saw woodworking machine comprising:
   a table for holding a work piece thereon;
   a band saw spaced from said table and having a cutting edge on one side and a band portion on an opposite side;
   power means for driving said band saw in a path;
   a plurality of idlers positioned to engage both sides of said band saw at the band portion thereof; and
   means for adjusting the position of each idler for adjusting the position of each of said idlers to engage said band saw whereby a portion of said band saw is formed into an undulated shape which cuts curved surfaces in the work piece when said band saw and the work piece come into contact; and
   means for adjusting said table laterally and vertically to position the work piece for contact with said band saw.

7. A band saw woodworking machine according to claim 6 which further includes means for tilting said table at an angle to a horizontal plane.

8. A band saw woodworking machine according to claim 7 wherein said means for tilting said table comprises adjustable screw means.

* * * * *